(12) United States Patent
Clark et al.

(10) Patent No.: US 8,783,103 B2
(45) Date of Patent: Jul. 22, 2014

(54) OFFSET DETECTION AND COMPENSATION FOR MICROMACHINED INERTIAL SENSORS

(75) Inventors: William A. Clark, Winchester, MA (US); John A. Geen, Tewksbury, MA (US)

(73) Assignee: Analog Devices, Inc., Norwood, MA (US)

(*) Notice: Subject to any disclaimer, the term of this patent is extended or adjusted under 35 U.S.C. 154(b) by 641 days.

(21) Appl. No.: 12/545,334

(22) Filed: Aug. 21, 2009

(65) Prior Publication Data

US 2011/0041609 A1 Feb. 24, 2011

(51) Int. Cl.
*G01C 19/56* (2012.01)
(52) U.S. Cl.
USPC .......................................... 73/504.12
(58) Field of Classification Search
CPC ........... G01C 19/5705; G01C 19/5712; G01C 19/5776
USPC ..................... 73/1.37, 1.38, 504.12
See application file for complete search history.

(56) References Cited

U.S. PATENT DOCUMENTS

| | | | |
|---|---|---|---|
| 2,309,853 A | 2/1943 | Lyman et al. | 33/204 |
| 2,513,340 A | 7/1950 | Lyman | 264/1 |
| 4,267,478 A | 5/1981 | Ljung et al. | 310/315 |
| 4,755,057 A | 7/1988 | Curby et al. | 356/350 |
| 4,884,446 A | 12/1989 | Ljung | 73/505 |
| 5,025,346 A | 6/1991 | Tang et al. | 361/283 |
| 5,034,905 A | 7/1991 | Widdau et al. | 364/606 |
| 5,275,047 A | 1/1994 | Zabler et al. | 73/505 |
| 5,349,855 A | 9/1994 | Bernstein et al. | 73/505 |
| 5,359,893 A | 11/1994 | Dunn | 73/505 |
| 5,392,650 A | 2/1995 | O'Brien et al. | 73/517 |
| 5,635,640 A | 6/1997 | Geen | 73/504.12 |
| 5,656,778 A | 8/1997 | Roszhart | 73/504.04 |
| 5,869,760 A | 2/1999 | Geen | 73/504.12 |
| 5,939,633 A | 8/1999 | Judy | 73/514.32 |
| 5,969,225 A | 10/1999 | Kobayashi | 73/1.37 |
| 5,992,233 A | 11/1999 | Clark | 73/514.35 |

(Continued)

FOREIGN PATENT DOCUMENTS

| | | | |
|---|---|---|---|
| FR | 2849183 | 6/2004 | G01C 19/56 |
| JP | 10-103960 | 4/1998 | G01C 19/56 |

(Continued)

OTHER PUBLICATIONS

Geen et al., "New iMEMS® Angular—Rate—Sensing Gyroscope," Analog Dialogue 37-03, pp. 1-4 (2003).

(Continued)

*Primary Examiner* — John Chapman, Jr.
(74) *Attorney, Agent, or Firm* — Sunstein Kann Murphy & Timbers LLP

(57) ABSTRACT

Error sources relating to the drive signal applied to the resonator of an inertial sensor, such as in-phase offset errors relating to the drive signal and/or electronic pass-through of the drive signal to accelerometer sense electronics, are detected by modulating the drive signal and sensing accelerometer signals that are induced by the modulated drive signal. Error sources related to aerodynamics of an inertial sensor resonator are detected by modulating the distance between the resonator and the underlying substrate and sensing accelerometer signals that are induced by such modulation. Compensating signals may be provided to substantially cancel errors caused by such error sources.

28 Claims, 10 Drawing Sheets

(56) References Cited

U.S. PATENT DOCUMENTS

| | | | |
|---|---|---|---|
| 6,032,531 A | 3/2000 | Roszhart | 73/504.04 |
| 6,122,961 A | 9/2000 | Geen et al. | 73/504.12 |
| 6,205,838 B1 | 3/2001 | Schmid et al. | 73/1.37 |
| 6,370,954 B1 | 4/2002 | Zerbini et al. | 73/514.01 |
| 6,505,511 B1 | 1/2003 | Geen et al. | 73/504.12 |
| 6,553,833 B1 | 4/2003 | Funk et al. | 73/504.14 |
| 6,564,637 B1 | 5/2003 | Schalk et al. | 73/504.12 |
| 6,654,424 B1 | 11/2003 | Thomae et al. | 375/257 |
| 6,837,107 B2 | 1/2005 | Geen | 73/504.04 |
| 6,877,374 B2 | 4/2005 | Geen | 73/504.14 |
| 6,883,361 B2 * | 4/2005 | Wyse | 73/1.38 |
| 6,892,576 B2 | 5/2005 | Samuels et al. | 73/514.32 |
| 7,032,451 B2 | 4/2006 | Geen | 73/504.04 |
| 7,051,590 B1 | 5/2006 | Lemkin et al. | 73/504.04 |
| 7,159,461 B2 | 1/2007 | Gallon et al. | 73/504.12 |
| 7,246,512 B2 | 7/2007 | Schroeder | 73/1.77 |
| 7,421,897 B2 | 9/2008 | Geen et al. | 73/504.12 |
| 7,640,803 B1 | 1/2010 | Gutierrez et al. | 73/504.04 |
| 8,151,641 B2 | 4/2012 | Geen | 73/504.12 |
| 2004/0211257 A1 | 10/2004 | Geen | 73/504.04 |
| 2005/0081633 A1 | 4/2005 | Nasiri et al. | 73/514.29 |
| 2005/0205959 A1 | 9/2005 | Chau et al. | 257/467 |
| 2006/0021433 A1 | 2/2006 | Willig et al. | 73/504.02 |
| 2006/0150745 A1 | 7/2006 | Lang | 73/849 |
| 2006/0201233 A1 | 9/2006 | Schroeder | 73/1.77 |
| 2008/0282833 A1 | 11/2008 | Chaumet | 74/5 R |
| 2011/0030474 A1 | 2/2011 | Kuang et al. | 73/504.16 |
| 2011/0041609 A1 | 2/2011 | Clark et al. | 73/514.29 |
| 2011/0167891 A1 | 7/2011 | Geen | 73/1.38 |

FOREIGN PATENT DOCUMENTS

| | | | | |
|---|---|---|---|---|
| JP | 2006-514749 | 5/2006 | | G01C 19/56 |
| JP | 2007-139642 | 6/2007 | | G01C 19/56 |
| JP | 2007-205975 | 8/2007 | | G01C 19/56 |

OTHER PUBLICATIONS

Saukoski, "System and Circuit Design for a Capacitive MEMS Gyroscope," Doctoral Dissertation, TKK Dissertations 116, Helsinki University of Technology, 279 pages (2008).

International Searching Authority, International Search Report—International Application No. PCT/US2010/045037, dated Apr. 6, 2011, together with the Written Opinion of the International Searching Authority, 14 pages.

Shusaku Yamamoto, Translation-Notice of Reasons for Rejection, Application No. 2012-525613, dated Jun. 7, 2013, 6 pages.

United States Patent and Trademark Office, Office Action, U.S. Appl. No. 13/774,129, dated Jun. 27, 2013, 9 pages.

Shusaku Yamamoto, Translation-Notice of Reasons for Rejection with the Official Action attached, Application No. 2012-525613, dated Oct. 28, 2013, 5 pages.

* cited by examiner

OFFSET DETECTION AND COMPENSATION FOR MICROMACHINED INERTIAL SENSORS

CROSS-REFERENCE TO RELATED APPLICATION

This application may be related to commonly-owned U.S. patent application Ser. No. 12/469,899 entitled Mode-Matching Apparatus and Method For Micromachined Inertial Sensors filed on May 21, 2009, which is hereby incorporated herein by reference in its entirety.

TECHNICAL FIELD

The present invention relates to micromachined inertial sensors, and more particularly to detecting and/or reducing offset error in micromachined inertial sensors.

BACKGROUND ART

Micromachined (MEMS) gyroscopes have become established as useful commercial items. Generally speaking, a MEMS gyroscope incorporates two high-performing MEMS devices, specifically a self-tuned resonator in the drive axis and a micro-acceleration sensor in the sensing axis. Gyroscope performance is very sensitive to such things as manufacturing variations, errors in packaging, driving, linear acceleration, and temperature, among other things. Basic principles of operation of angular-rate sensing gyroscopes are well understood and described in the prior art (e.g., Geen, J. et al., New iMEMS Angular-Rate-Sensing Gyroscope, Analog Devices, Inc., Analog Dialog 37-03 (2003), available at http://www.analog.com/library/analogDialogue/archives/37-03/gyro.html, which is hereby incorporated herein by reference in its entirety).

The principles of vibratory sensing angular rate gyroscopes with discrete masses are long-established (see, for example, Lyman, U.S. Pat. No. 2,309,853 and Lyman, U.S. Pat. No. 2,513,340, each of which is hereby incorporated herein by reference in its entirety). Generally speaking, a vibratory rate gyroscope works by oscillating a proof mass (also referred to herein as a "shuttle" or "resonator"). The oscillation is generated with a periodic force applied to a spring-mass-damper system at the resonant frequency. Operating at resonance allows the oscillation amplitude to be large relative to the force applied. When the gyroscope is rotated, Coriolis acceleration is generated on the oscillating proof mass in a direction orthogonal to both the driven oscillation and the rotation. The magnitude of Coriolis acceleration is proportional to both the velocity of the oscillating proof mass and the rotation rate. The resulting Coriolis acceleration can be measured by sensing the deflections of the proof mass. The electrical and mechanical structures used to sense such deflections of the proof mass are referred to generally as the accelerometer.

Many MEMS gyroscopes employ balanced comb drives of the type described generally in Tang, U.S. Pat. No. 5,025,346, which is hereby incorporated herein by reference in its entirety. General use of a micromachined layer above a semiconductor substrate with Coriolis sensing perpendicular to that substrate is described generally in Zabler, U.S. Pat. No. 5,275,047, which is hereby incorporated herein by reference in its entirety. Exemplary MEMS gyroscopes are described in Bernstein, U.S. Pat. No. 5,349,855; Dunn, U.S. Pat. No. 5,359,893; Geen, U.S. Pat. No. 5,635,640; Geen, U.S. Pat. No. 5,869,760; Zerbini, U.S. Pat. No. 6,370,954; and Geen U.S. Pat. No. 6,837,107, each of which is hereby incorporated herein by reference in its entirety. The latter four patents employ rotationally vibrated mass(es).

One problem in the manufacture of MEMS gyroscopes is that the Coriolis signals on which they depend are relatively small. It has been long recognized (e.g. Ljung, U.S. Pat. No. 4,884,446 or O'Brien, U.S. Pat. No. 5,392,650 or Clark, U.S. Pat. No. 5,992,233, each of which is hereby incorporated herein by reference in its entirety) that the signal size of a vibratory gyroscope can be magnified by operating the Coriolis accelerometer at resonance, i.e., by matching the frequencies of the accelerometer to that of the vibrating shuttle. Generally speaking, this increase in signal size eases the associated electronics requirements and thereby reduces cost. However, generally speaking, the larger the resonant amplification, the more sensitive is the accelerometer phase shift to small frequency perturbations. Such phase shifts are particularly deleterious to gyroscope performance, so it is generally necessary, in practice, to either well separate the frequencies or tightly servo the frequency of the accelerometer to the frequency of the shuttle. A mechanism for controlling the frequency of a differential capacitance accelerometer is conveniently available from changing the applied common mode voltage.

In vibratory rate gyroscopes, numerous factors, such as imperfections in the various mechanical structures and in the electronics used for driving and sensing, can cause oscillations of the accelerometer that can be confused with Coriolis acceleration and rotation rate. Such error sources are often referred to collectively as gyroscope offset. There are two main classes of gyroscope offset error, namely quadrature errors and in-phase errors.

In the presence of quadrature errors, the accelerometer experiences forces that are largely proportional to the resonator displacement and are approximately 90 degrees phase shifted with respect to the Coriolis acceleration signal. An example of quadrature error results when the vibratory motion is not perfectly orthogonal to the accelerometer.

In the presence of in-phase errors, the accelerometer experiences forces that are largely proportional to the resonator velocity (which at resonance are also proportional to the vibratory drive force) and are substantially in-phase or synchronous with the Coriolis acceleration signal. There are two main classes of in-phase errors, namely in-phase errors that are proportional to resonator velocity and in-phase errors that are in-phase or synchronous with resonator velocity but have origins other than the actual motion of the resonator. An example of the former includes aerodynamic effects on the resonator. Examples of the latter include in-phase error caused by misalignment of the resonator drive mechanism such that the vibratory drive force is not perfectly orthogonal to the accelerometer and in-phase error caused by electrical feed-through from the drive system to the accelerometer sense electronics.

Gyroscope offset error can be reduced to some degree through device design, manufacture, and packaging, but there are practical limits to these approaches, particularly where gyroscope offset can vary over time, for example, due to changes in temperature or stress.

SUMMARY OF THE INVENTION

In accordance with one aspect of the invention there is provided a method, an inertial sensor, and a controller for detecting at least one error source relating to a drive signal applied to a resonator of an inertial sensor by providing a modulated drive signal to the resonator and sensing accelerometer signals induced by the modulated drive signal to detect the at least one error source.

In accordance with another aspect of the invention there is provided a method, an inertial sensor, and a controller for detecting at least one error source relating to aerodynamics of an inertial sensor resonator by providing a drive signal to cause resonance of the resonator, providing a modulated test signal to modulate the distance between the resonator and an underlying substrate, and sensing accelerometer signals induced by the modulated test signal to detect the at least one error source.

In any of the above embodiments, the signal may be modulated using one of amplitude modulation, frequency modulation, on/off keying, and a spread spectrum modulation. Detecting accelerometer signals induced by the modulated drive or test signal may include demodulating accelerometer signals based on a modulation signal used to modulate the drive/test signal. At least one compensating signal may be provided to substantially cancel errors introduced by the at least one error source (e.g., a compensating signal may be provided to a set of in-phase-compensating electrodes, e.g., to substantially cancel in-phase offset error, pass-through, and/or aerodynamic effects). The accelerometer may include at least one of an x-axis sensor, a y-axis sensor, and a z-axis sensor. The resonator may include one or more shuttles, and in embodiments including a plurality of shuttles, the shuttles may be coupled to resonate at a single resonance frequency.

BRIEF DESCRIPTION OF THE DRAWINGS

The foregoing features of the invention will be more readily understood by reference to the following detailed description, taken with reference to the accompanying drawings, in which:

FIG. 7 is a schematic top-view diagram of a vibratory gyroscope in accordance with an alternative embodiment of the present invention, in which

It should be noted that the foregoing figures and the elements depicted therein are not necessarily drawn to consistent scale or to any scale. Unless the context otherwise suggests, like elements are indicated by like numerals.

DETAILED DESCRIPTION OF SPECIFIC EMBODIMENTS

Figure 1:
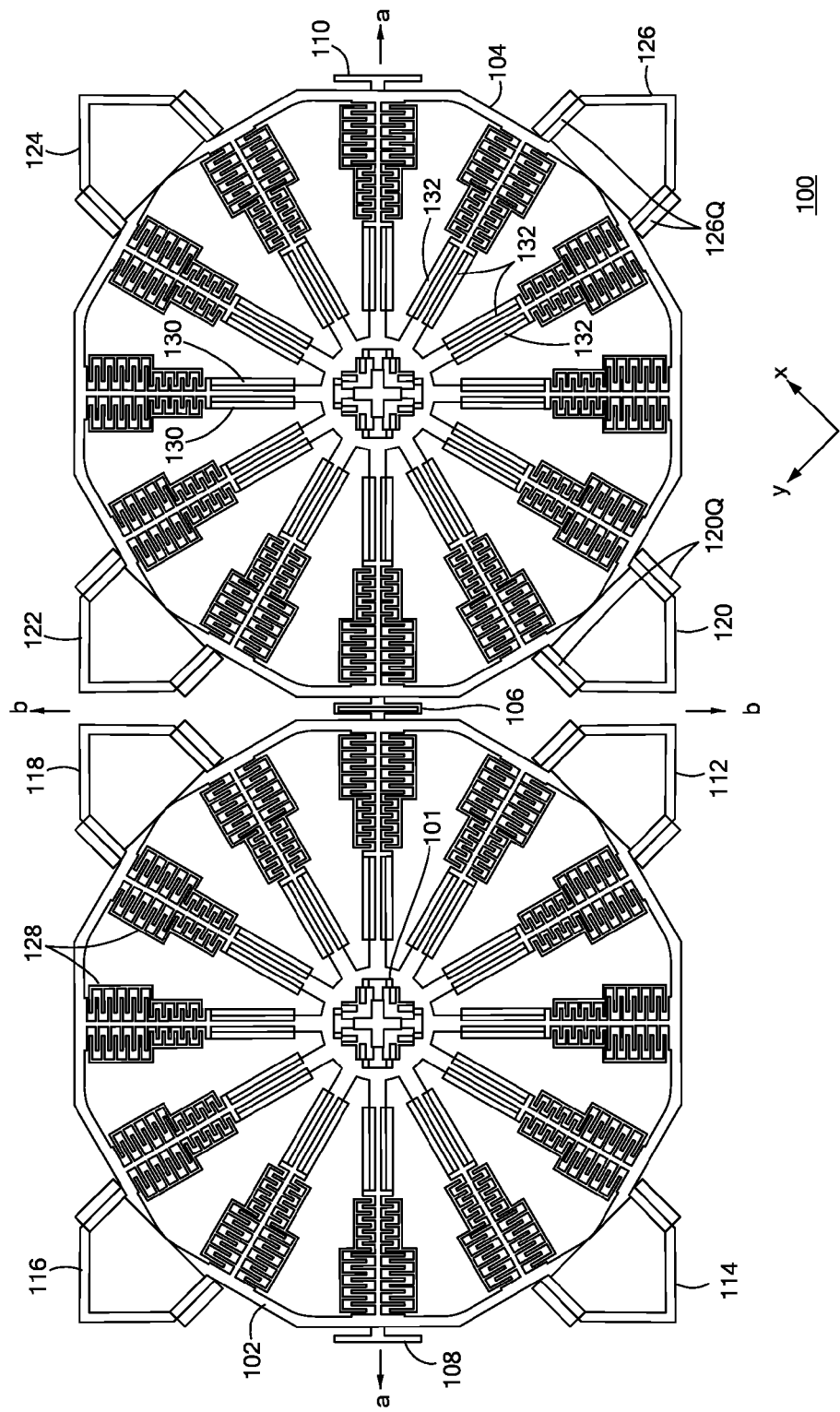
FIG. 1 is a schematic top-view diagram of a vibratory X-Y axis gyroscope in accordance with an exemplary embodiment of the present invention, highlighting the device layer structures.

Definitions. As used in this description and the accompanying claims, the following terms shall have the meanings indicated, unless the context otherwise requires.

A "set" includes one or more elements.

An "electrode" is a structure through which an electrical or electromechanical effect is applied and/or sensed. In exemplary embodiments, various electrodes are used for applying and/or sensing electrical or electromechanical effects through capacitive coupling, although it should be noted that other types of electrodes and couplings may be used (e.g., piezoelectric).

The term "quality factor" or "Q-factor" or simply "Q" denotes a dimensionless parameter that compares the time constant for decay of an oscillating physical system's amplitude to its oscillation period. Equivalently, it compares the frequency at which a system oscillates to the rate at which it dissipates its energy. A higher Q indicates a lower rate of energy dissipation relative to the oscillation frequency, so the oscillations die out more slowly. A system with a high Q resonates with a greater amplitude (at the resonant frequency) than one with a low Q factor, and its response falls off more rapidly as the frequency moves away from resonance.

The term "$f_0$" may be used as a shorthand to refer to the resonance frequency of the resonator.

The "mode" of a resonating body is the shape of motion of the body at resonance.

Embodiments of the present invention provide for detecting and reducing certain types of gyroscope error sources in-situ. One error source is quadrature error, which is measured and cancelled using quadrature cancellation electrodes. A second is associated with an imperfection in the drive source that results in in-phase error. A third in-phase error source results from parasitic feed-through. A fourth in-phase error source is associated with the aerodynamics of the structure. In all these examples, the error source is measured and driven to zero. Quadrature is demodulated from the main signal and cancelled using special electrodes. For in-phase error sources (e.g., drive imperfection, parasitic feed-through, and aerodynamics), measurement of the error source involves additional stimulation.

In exemplary embodiments, measuring drive imperfection is done by modulating the drive force, demodulating the resulting signal to arrive at a measure of drive imperfection, and then applying a cancellation force.

Similarly, the aerodynamic error source is also modulated to allow detection. Aerodynamic error results from lift generated as the gyro structure moves through the surrounding gas/fluid. This error is a strong function of the geometric imperfection of both the gyroscope structure and the underlying substrate. Modulation of the error is accomplished by altering or modulating the "fly height" of the gyroscope structure. The fly height is altered by applying a force (such as electrostatic force) perpendicular to the substrate. The aerodynamic force changes with fly height modulation and can be demodulated and again cancelled with electrostatics similar to the drive imperfections.

In embodiments of the present invention, various gyroscope error sources associated with the force used to drive the proof mass oscillation are detected by modulating the drive force and sensing corresponding signals that are induced in the Coriolis channel. Because the magnitude of in-phase offset error is related to the magnitude of the drive force, modulation of the drive force generally results in modulation of the in-phase offset error. This source of offset error may be cancelled with feedback electronically, electro-mechanically, or otherwise, without disturbing the Coriolis acceleration signal used to identify rotation rate. The drive signal may be modulated using amplitude modulation, frequency modulation, on/off keying, a spread spectrum technique, or other appropriate modulation technique. Certain exemplary embodiments modulate the magnitude of the drive force using an easily generated test signal at a frequency that is sufficiently high for the resonator amplitude to remain largely unchanged so as to leave the Coriolis acceleration unmodulated. The test signal frequency is typically an integer fraction of the resonance frequency (e.g., $f_0/8$).

Figure 2:
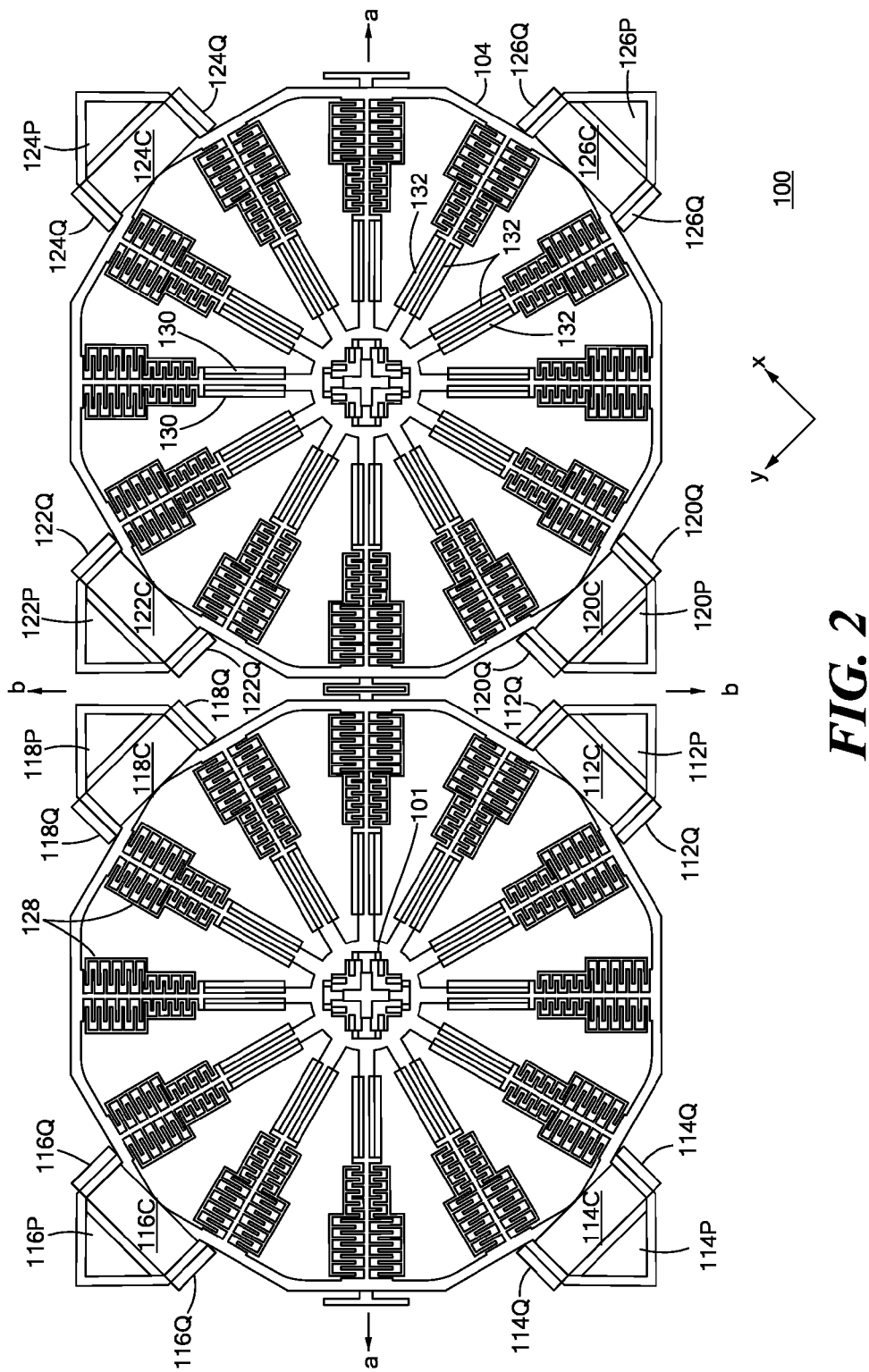
FIG. 2 is a schematic top-view diagram of a vibratory X-Y axis gyroscope in accordance with an exemplary embodiment of the present invention, highlighting the substrate layer structures in relation to the device layer structures highlighted in FIG. 1.

In order to detect and/or reduce in-phase errors, particularly in-phase errors having origins other than the actual motion of the resonator (e.g., in-phase error caused by misalignment of the resonator drive mechanism and in-phase error caused by electrical feed-through from the drive system to the accelerometer sense electronics, which are generally considered to be the largest sources of in-phase error in gyroscopes of the type shown in FIGS. 1 and 2), embodiments of the present invention modulate the drive signal provided to the drive combs 128 by a high-frequency test (carrier) signal to induce in-phase accelerometer offset signals in the Coriolis output. The test signal is provided in a manner that does not affect the Coriolis signals, such as at an out-of-band frequency sufficiently below the resonator frequency, so that the shuttles will respond to the test signals without substantially changing the resonator amplitude. For example, in an exemplary embodiment, the gyroscope response may be below approximately 32 Hz, and the resonator frequency (fo) may be approximately 64 KHz, and the test signal frequency may be approximately 1 KHz to 8 KHz (i.e., $f_0/64$ to $f_0/8$). Furthermore, the modulation applied to the drive signal preferably averages to zero over time.

Similarly, electrical pass-through from the drive electronics to other electronic systems such as the Coriolis sense electronics may be detected through modulation of the drive signal and may be mitigated electronically, electro-mechanically, or otherwise.

Because the resonator is a high Q system, modulation of the drive force can be done without substantially changing the oscillation of the resonator and hence the Coriolis acceleration generated by a rotation rate. However, the acceleration sensor and the associated sense electronics react quickly to a change to the resonator drive. A modulation of the drive force can be use to expose a major source of offset without disturbing the primary signal.

FIGS. 1 and 2 are schematic top-view diagrams of a vibratory X-Y axis gyroscope 100 in accordance with an exemplary embodiment of the present invention. This vibratory gyroscope operates generally as disclosed in Geen, U.S. Pat. No. 5,635,640, which is hereby incorporated herein by reference in its entirety. Specifically, this vibratory gyroscope includes various micromachined gyroscope structures in a device layer oriented above an underlying substrate having various substrate layer structures. For convenience, relevant gyroscope structures are described below with reference to axes labeled "a" and "b" in the device plane. The axes labeled "x" and "y" represent the axes about which Coriolis acceleration, and hence rotation rate, is sensed (i.e., the gyroscope sensing axes).

The gyroscope structures in the device plane include two rotationally-dithered masses (referred to hereinafter as shuttles) 102 and 104, each including an outer rim suspended via a number of spokes (in this case, twelve spokes, although different embodiments may use different numbers of spokes) from a central hub that is movably coupled to the substrate via a post (shaped like a "+") and suspension flexures 101 (for convenience, only one of the two post and suspension flexure arrangements is highlighted). The posts are affixed to the substrate, and the suspension flexures allow the shuttles to oscillate rotationally, with coupling flexure 106 and support flexures 108 and 110 helping to ensure that the shuttles oscillate in anti-phase with one another (i.e., shuttle 104 rotates counterclockwise when shuttle 102 is rotating clockwise, and vice versa) nominally within the device plane. For convenience, the dithered gyroscope structures in the device plane may be referred to collectively as a resonator.

Each of the spokes includes finger structures that interdigitate with corresponding comb structures 128 affixed to the substrate (for convenience, only two of the twenty-four sets of combs are highlighted, with each set including two combs). In this exemplary embodiment, the twenty-four sets of combs 128 are used for driving motion of the shuttles, where one comb in each pair is used for driving the shuttle in a clockwise direction and the other is used for driving the shuttle in a counterclockwise direction, specifically by applying alternating electrical signals to the combs to cause the shuttles 102 and 104 to oscillate through capacitive coupling with the finger structures of the spokes. Velocity sensing electrodes are used in a feedback loop to sense and control oscillation of the shuttles. In this exemplary embodiment, velocity sensing electrodes 130 on the substrate underlying the radial edges of the a-oriented and b-oriented spokes (i.e., four spokes of each shuttle) are used for velocity sensing (for convenience, only one of the eight pairs of velocity sensing electrodes 130 is highlighted). It should be noted that some of the combs 128 may be used for velocity sensing in addition to, or in lieu of, separate velocity sensing electrodes 130.

In this exemplary embodiment, each of the shuttles includes four protruding plates that overlie corresponding electrode arrangements on the substrate, with each electrode arrangement including a Coriolis-sensing electrode, an in-phase-compensating electrode, and a pair of quadrature-compensating electrodes on either side of the Coriolis-sensing and in-phase-compensating electrodes. Specifically, shuttle 102 includes plates 112, 114, 116, and 118 that respectively overlie arrangements (112C, 112P, 112Q), (114C, 114P, 114Q), (116C, 116P, 116Q), and (118C, 118P, 118Q), while shuttle 104 includes plates 120, 122, 124, and 126 that respectively overlie arrangements (120C, 120P, 120Q), (122C, 122P, 122Q), (124C, 124P, 124Q), and (126C, 126P, 126Q), where "C" designates the Coriolis-sensing electrode, "P" designates the in-phase-compensating electrode, and "Q" designates the quadrature-compensating electrodes. Each plate completely overlies the Coriolis-sensing and in-phase-compensating electrodes but only partially overlies the quadrature-compensating electrodes, such that capacitive coupling between the plate and each of the quadrature-compensating electrodes is dependent on the rotational position of the shuttle while capacitive coupling between the plate and the Coriolis-sensing and in-phase-compensating electrodes is substantially independent of the rotational position of the shuttle. In this exemplary embodiment, the plates are positioned so as to align with the x and y axes (i.e., at approximately 45 degree angles relative to the a and b axes). It should be noted that, in this exemplary embodiment, the Coriolis-sensing electrodes are not aligned with any of the drive combs 128. It also should be noted that the velocity sensing electrodes 130 and the quadrature-compensating electrodes are somewhat interchangeable; a particular pair of electrodes may be used for velocity sensing and/or quadrature adjustment as desired for a particular implementation. The various electrodes are discussed in more detail below.

While the shuttles are oscillating at their resonance frequency ($f_0$), driven via the drive combs 128 with feedback provided via the velocity sensing electrodes 130, out-of-plane movements of the gyroscope about the x and y axes cause the shuttles 102 and 104 to tip out-of-plane relative to the substrate through Coriolis forces, and these out-of-plane (i.e., Coriolis axis) movements of the shuttles are detected via the Coriolis-sensing electrodes through capacitive coupling with the plates. In this exemplary embodiment, such Coriolis forces are sensed in two axes by differential capacitance with respect to the Coriolis-sensing electrodes. For example, a rotation of the gyroscope about the x-axis can cause plates 114 and 124 to move toward their respective Coriolis-sensing electrodes while plates 118 and 120 move away from their respective Coriolis-sensing electrodes, and these movements are detected by changes in capacitance between each plate and its corresponding Coriolis-sensing electrode, with the signals obtained from the four Coriolis-sensing electrodes combined to provide a gyroscope output signal representing the movement of the gyroscope. Similarly, a rotation of the gyroscope about the y-axis can cause plates 116 and 126 to move toward their respective Coriolis-sensing electrodes while plates 112 and 122 move away from their respective Coriolis-sensing electrodes. It should be noted that the plates 112, 114, 116, 118, 120, 122, 124, and 126 fully overlay their respective Coriolis-sensing electrodes throughout the entire rotational range of motion of the shuttles so that signals obtained from the Coriolis-sensing electrodes are substantially independent of the rotational displacement of the shuttles.

As discuss above, even in the absence of any external movement of the gyroscope, oscillation of the shuttles typically results in slight out-of-plane movements of the shuttles, for example, due to imbalances in the shuttles and their respective support structures, and such out-of-plane movements of the shuttles can be misinterpreted as Coriolis signals and therefore represent error signals. As discussed above, such error signals may include an in-phase component and a quadrature component. While the quadrature error signals can be substantially greater than the phase error signals and therefore can swamp electronic circuitry that compensates for phase errors, it is generally desirable to remove both error components. In a gyroscope of the type shown in FIGS. 1 and 2, where the accelerometer resonance mode is out-of-plane with the shuttle resonance mode, it is generally impractical to use mechanical structures (e.g., levers and flexures) to eliminate the quadrature and in-phase error components.

In order to detect and/or reduce in-phase errors such as in-phase error caused by misalignment of the resonator drive mechanism, in-phase error caused by aerodynamic effects, and in-phase error caused by electrical feed-through from the drive system to the accelerometer sense electronics, embodiments of the present invention modulate the drive signal provided to the drive combs 128 by a high-frequency test (carrier) signal to induce in-phase accelerometer offset signals in the Coriolis output. The test signal is provided in a manner that does not affect the Coriolis signals, such as at an out-of-band frequency sufficiently below the resonator frequency, so that the shuttles will respond to the test signals without substantially changing the resonator amplitude. For example, in an exemplary embodiment, the gyroscope response may be below approximately 32 Hz, and the resonator frequency (f0) may be approximately 64 KHz, and the test signal frequency may be approximately 1 KHz to 8 KHz (i.e., f0/64 to f0/8). The drive signal may be modulated using amplitude modulation, frequency modulation, on/off keying, a spread spectrum technique, or other appropriate modulation technique. Furthermore, the modulation applied to the drive signal preferably averages to zero over time.

The in-phase offset errors may be reduced by imparting compensating forces on the resonator and/or the accelerometer to adjust such things as movement of the shuttles in the device plane (e.g., using trim electrodes that affect in-plane movements of the shuttles) or movement of the shuttles out-of-plane (e.g., in the accelerometer axis) based on the induced in-phase accelerometer offset signals in the Coriolis output, e.g., by placing an appropriate biasing voltage on the in-phase-compensating electrodes until there are no signals in the Coriolis output corresponding to the test signal. Additionally or alternatively, pass-through from the drive electronics to other electronic systems such as the Coriolis sensing electronics may be reduced electronically based on the induced in-phase accelerometer offset signals in the Coriolis output, e.g., by applying a compensating signal at the input of the Coriolis channel amplifier. Some exemplary circuit configurations for mitigating in-phase offset errors and mitigating signal pass-through are described below.

Quadrature errors may be reduced by exerting a net torque on the shuttles in the Coriolis axis (i.e., out of the device plane) in a manner similar to that described by Clark in U.S. Pat. No. 5,992,233 or Geen in U.S. Pat. No. 7,032,451, each of which is hereby incorporated herein by reference in its entirety. In the exemplary embodiment shown in FIGS. 1 and 2, quadrature-compensating electrodes on the substrate positioned under the edges of the plates (i.e., quadrature-compensating electrodes 112Q, 114Q, 116Q, 118Q, 120Q, 122Q, 124Q, and 126Q) as well as under the radial edges of the eight spokes of each shuttle positioned between the a-oriented and b-oriented spokes (i.e., quadrature-compensating electrodes 132; for convenience, only four of the sixteen pairs of quadrature-compensating electrodes 132 are highlighted) are used for making quadrature adjustments, although in alternative embodiments, similar quadrature adjustments can be made, for example, by applying bias voltages to the Coriolis sensing electrodes. A DC quadrature adjustment signal is applied to the quadrature adjusting electrodes so as to exert a net torque on the shuttles. Since the quadrature-compensating electrodes extend beyond the edges of the plates and spokes, the torque produced by the quadrature-compensating electrodes is proportional to the vibratory displacement of the shuttles in the device plane and is a function of the difference between the potentials of the electrodes. Thus, the torque causes a quadrature motion in the Coriolis axis (i.e., the axis normal to the device plane) that is modulated by the potential of the quadrature-compensating electrodes. Quadrature suppression is also discussed in Lemkin, U.S. Pat. No. 7,051,590; in Chaumet, U.S. Patent Application Publication No. 2008/

0282833; and in Saukoski, M., *System and Circuit Design for a Capacitive MEMS Gyroscope*, Doctoral Dissertation, TKK Dissertations 116, Helsinki University of Technology, Espoo, Finland (2008), each of which is hereby incorporated herein by reference in its entirety.

Figure 3:
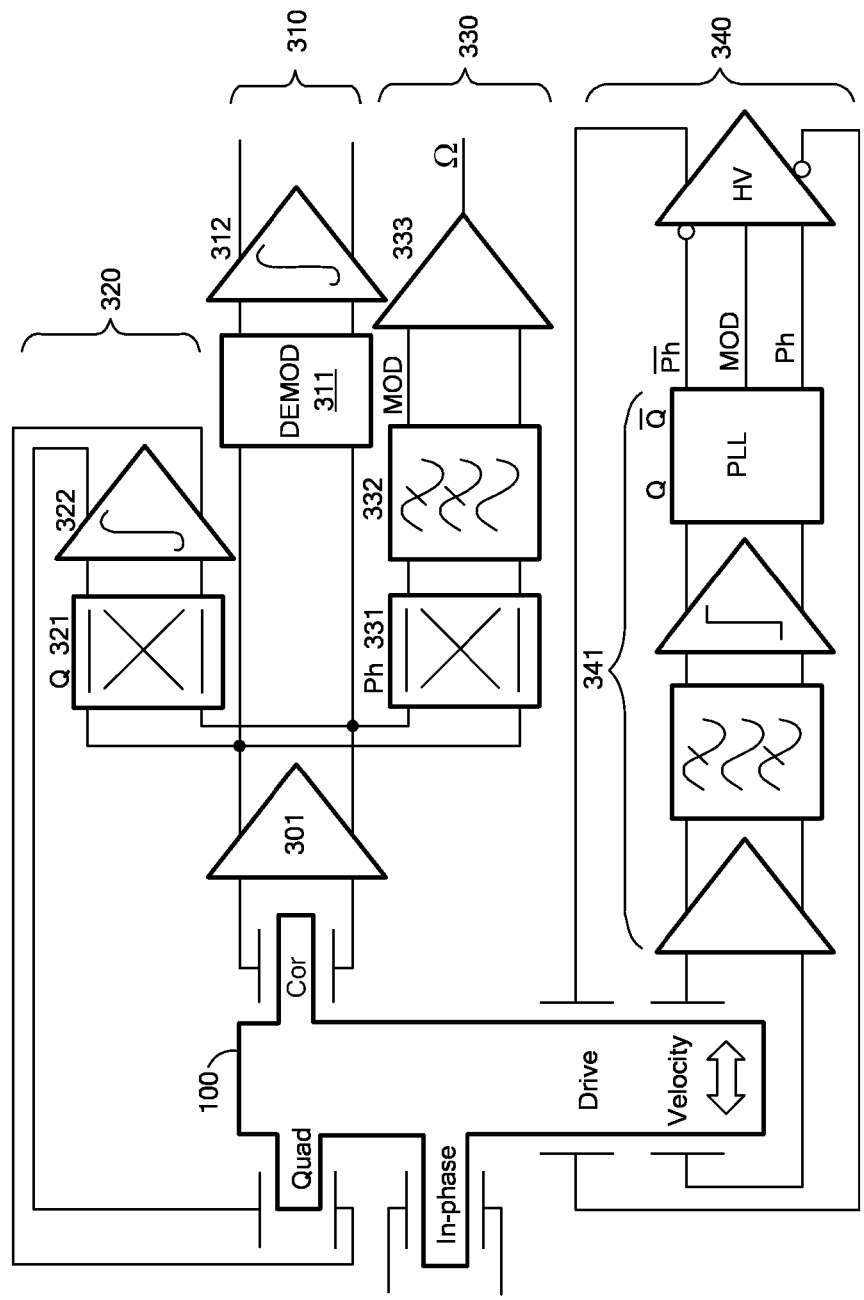
FIG. 3 is a schematic block diagram showing electronic control circuitry suitable for use with the gyroscope 100 for detecting in-phase offset errors, in accordance with an exemplary embodiment of the present invention.

FIG. 3 is a schematic block diagram showing electronic control circuitry suitable for use with the gyroscope 100 for detecting in-phase offset errors, in accordance with an exemplary embodiment of the present invention. Among other things, this electronic circuitry includes an offset detector 310, a quadrature compensating servo 320, a Coriolis output circuit 330, a shuttle drive servo 340, and related circuitry.

The shuttle resonance drive servo 340 provides a modulated drive signal to the drive combs based on signals received from the velocity sensing electrodes. The drive signal may be modulated using amplitude modulation, frequency modulation, on/off keying, a spread spectrum technique, or other appropriate modulation technique. In this exemplary embodiment, the drive signal is modulated using a test signal (labeled in the figure as "MOD") derived from the phase-locked loop (PLL) circuit 341 that feeds the resonator drive electronics; in other embodiments, the test signal may be derived from other sources. Because the resonator is a high Q system, modulation of the drive force can be done without substantially changing the oscillation of the resonator and hence the Coriolis acceleration generated by a rotation rate. As discussed in detail below, the MOD signal also feeds a demodulator in the offset detector 310 for extracting a signal representative of the offset, and the MOD signal may be used to feed a modulator in the optional in-phase compensating servo 350. The shuttle resonance drive servo 340 also provides phase and quadrature reference signals.

The offset detector 310 receives amplified (301) Coriolis channel signals from the Coriolis-sensing ("Cor") electrodes, demodulates (311) the Coriolis channel signals with the MOD reference, and integrates (312) the demodulated signals to produce an offset output signal reflecting the offset error. This offset output signal may be used in and of itself, for example, for in-situ quality assurance testing during manufacturing or for device calibration or testing. Additionally or alternatively, circuitry may be included to mitigate the offset error (e.g., by adjusting the motion of the shuttles in the device plane) and/or the effects of offset error based on the offset output signal (e.g., by adjusting motion of the shuttles in the accelerometer axis or by adjusting the Coriolis channel signals to remove offset effects).

The quadrature servo 320 receives amplified (301) Coriolis channel signals from the Coriolis-sensing ("Cor") electrodes, demodulates (321) the Coriolis channel signals with the quadrature reference, and integrates (322) the demodulated signals to produce low-frequency differential quadrature nullifying signals that are fed back to the quadrature adjustment ("Quad") electrodes, as shown by the feedback signals from the quadrature servo 320 to the quadrature-compensating (Quad) electrodes.

The Coriolis output circuit 330 receives amplified (301) Coriolis channel signals from the Coriolis-sensing ("Cor") electrodes, demodulates (331) the Coriolis channel signals with the phase reference, filters (332) the demodulated signals to remove high-frequency components, and amplifies (333) the filtered signals to produce the gyroscope output signal.

Figure 4:
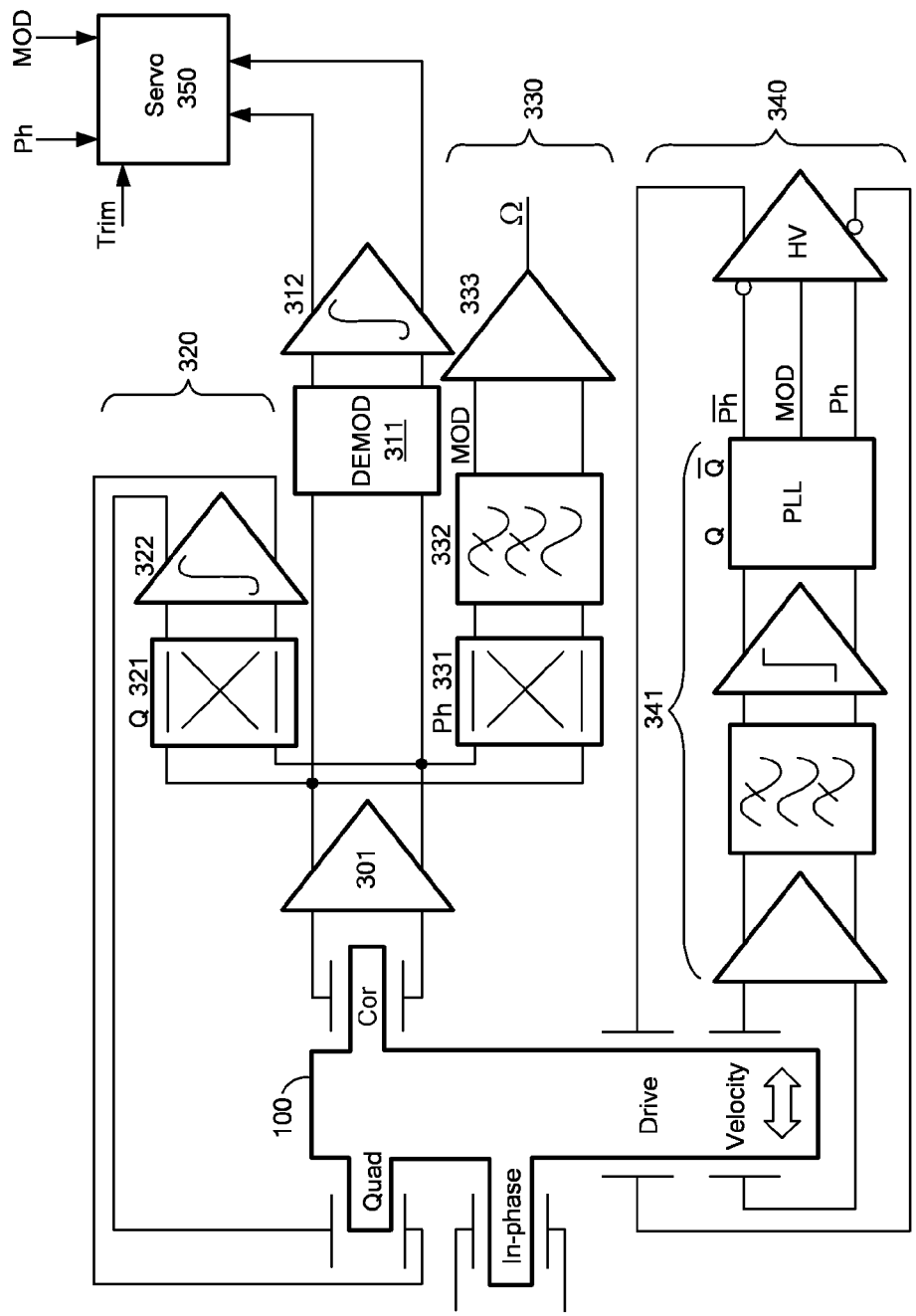
FIG. 4 is a schematic block diagram showing the electronic control circuitry of FIG. 3 including an optional in-phase compensating servo for mitigating in-phase offset errors, in accordance with an exemplary embodiment of the present invention.

FIG. 4 is a schematic block diagram showing the electronic control circuitry of FIG. 3 including an optional in-phase compensating servo 350 for mitigating in-phase offset errors, in accordance with an exemplary embodiment of the present invention. The in-phase compensating servo 350 generates one or more compensating signals based on the phase reference, the MOD reference, the offset output signal from the offset detector 310, and/or a trim quantity. The compensating signals may be used to impart compensating forces on the resonator and/or the accelerometer to adjust such things as movement of the shuttles in the device plane (e.g., using trim electrodes that affect in-plane movements of the shuttles) or movement of the shuttles out-of-plane (e.g., in the accelerometer axis). Additionally or alternatively, the compensating signals may be used to electronically cancel pass-through from the drive electronics to other electronic systems such as the Coriolis sensing electronics.

Figure 5:
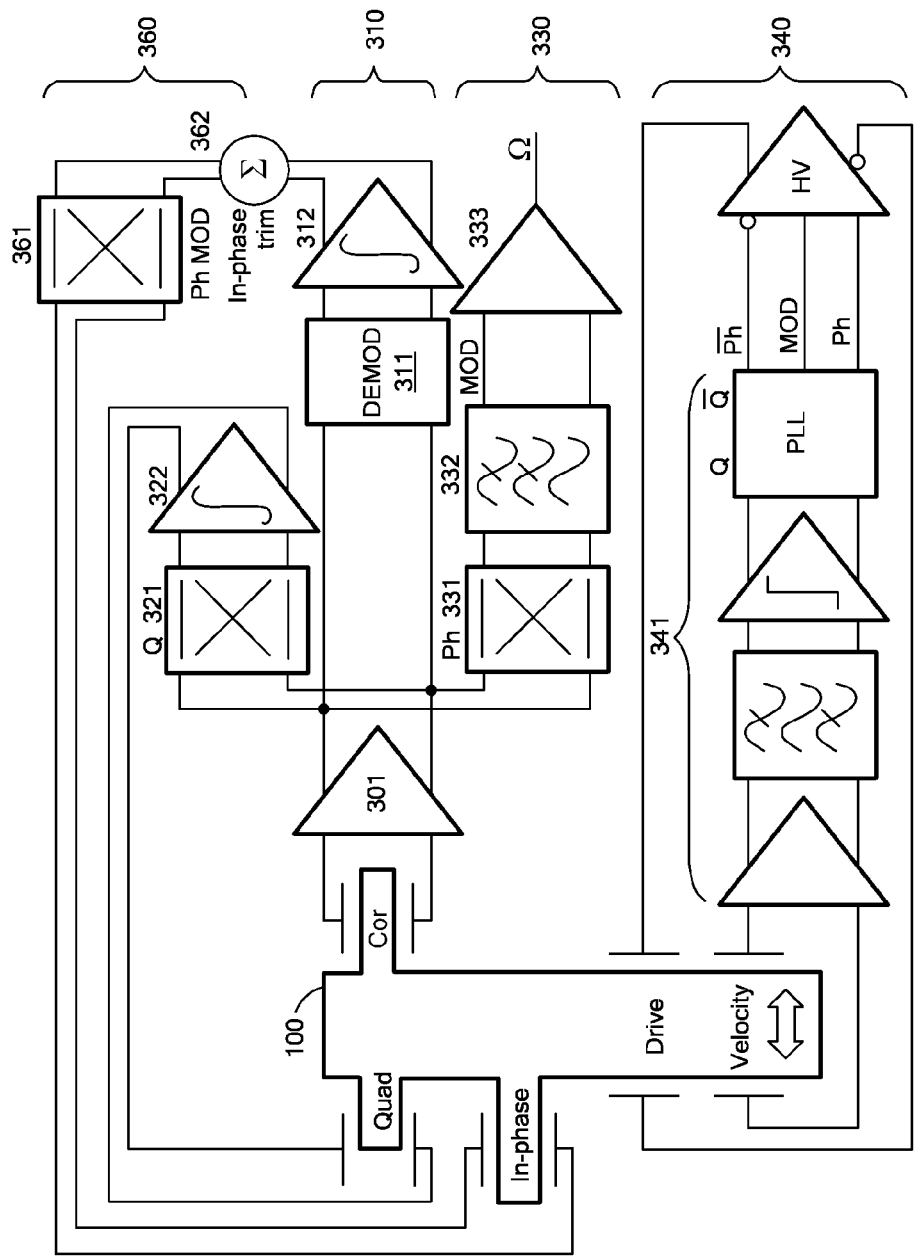
FIG. 5 is a schematic block diagram showing the electronic control circuitry of FIG. 3 including an optional in-phase compensating servo configured for mitigating the effects of resonator drive force misalignment, in accordance with an exemplary embodiment of the present invention.

FIG. 5 is a schematic block diagram showing the electronic control circuitry of FIG. 3 including an optional in-phase compensating servo 360 configured for mitigating the effects of resonator drive force misalignment, in accordance with an exemplary embodiment of the present invention. The in-phase compensating servo 360 includes a modulator 361 that provides a modulated compensating signal to the in-phase-compensating electrodes. The modulator 361 is driven by the phase (Ph) and MOD references and by an in-phase trim 362 (i.e., the offset output signal from the offset detector 310 adjusted by a trim factor). The in-phase trim 362 is adjusted to cancel in-phase offsets due to resonator drive misalignment. Since this modulator is intended to cancel imperfections in the drive system, it should be modulated in concert with the resonator drive so that the already compensated imperfections are not exposed by the modulation of the drive signals. If additional offset is discovered, that offset can be fed-back into a separate offset cancelling mechanism, for example, to adjust motion of the shuttles in the device plane. In this manner, changes in offset can be detected and cancelled without disturbing the signal of interest, Coriolis acceleration, or equivalently, rotation rate.

Figure 6:
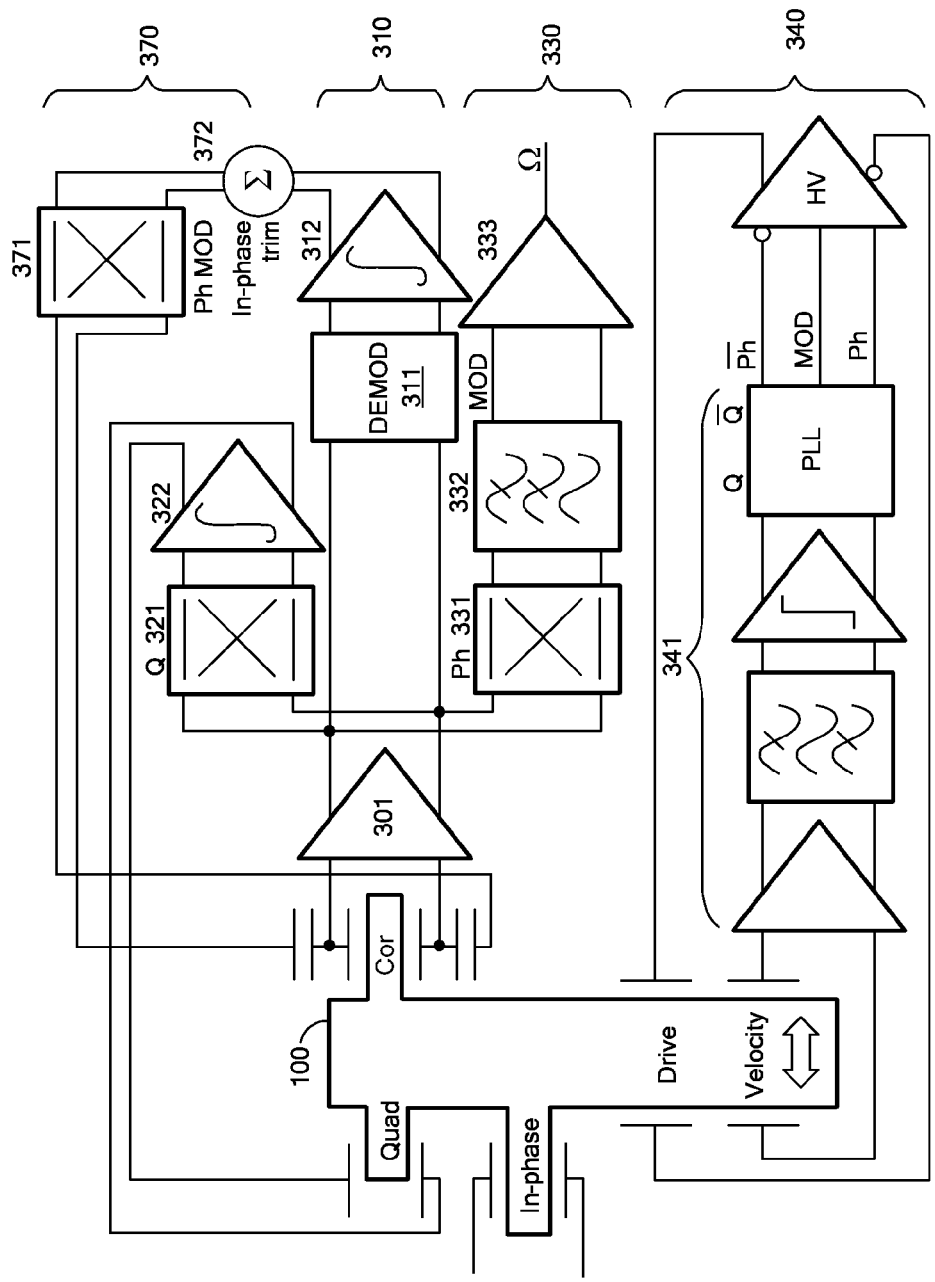
FIG. 6 is a schematic block diagram showing the electronic control circuitry of FIG. 3 including an optional in-phase compensating servo configured for mitigating the effects of electrical feed-through from the drive electronics to the Coriolis sensing electronics, in accordance with an exemplary embodiment of the present invention.

FIG. 6 is a schematic block diagram showing the electronic control circuitry of FIG. 3 including an optional in-phase compensating servo 370 configured for mitigating the effects of electrical feed-through from the drive electronics to the Coriolis sensing electronics, in accordance with an exemplary embodiment of the present invention. The in-phase compensating servo 370 includes a modulator 371 that provides a modulated compensating signal that is capacitively coupled at the input of the Coriolis channel amplifier 301 rather than to the in-phase-compensating electrodes. The modulator 371 is driven by the phase (Ph) and MOD references and may also be driven by a trim quantity and/or feedback from the offset detector 310 as shown in the figure. It should be noted that the servo 370 is similar to the servo 360 shown in FIG. 5 although the signal processing and signal levels for the offset cancellation may be different.

It should be noted that the electronic control circuitry may include multiple servos, e.g., one coupled to the in-phase-compensating electrodes for mitigating drive force misalignment as discussed above with reference to FIG. 5 and another coupled to the Coriolis channel amplifier 301 for mitigating feed-through as discussed above with reference to FIG. 6.

In the exemplary embodiment shown in FIGS. 1 and 2, each shuttle includes plates that extend outwardly from the perimeter of the shuttle, with each plate completely overlaying a corresponding Coriolis (acceleration sensor) electrode and partially overlaying a pair of quadrature electrodes on opposite sides of the Coriolis electrode, such that capacitive coupling between the plate and the quadrature electrodes is dependent on the rotational position of the shuttle while capacitive coupling between the plate and the Coriolis electrode is substantially independent of the rotational position of the shuttle. It should be noted, however, that different shuttle and/or electrode configurations may be used in alternative embodiments. For example, in certain alternative embodiments, portions of the shuttle perimeter may be in capacitive coupling with the Coriolis-sensing electrodes.

Figure 7A:
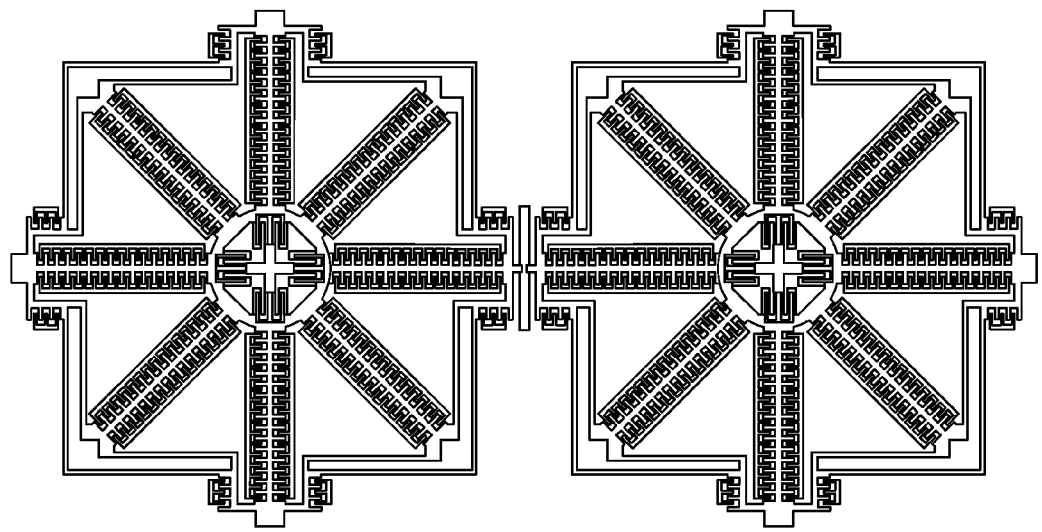
FIG. 7A is a top view of the structures and FIG. 7B is a magnified view of certain structures.
Figure 7B:
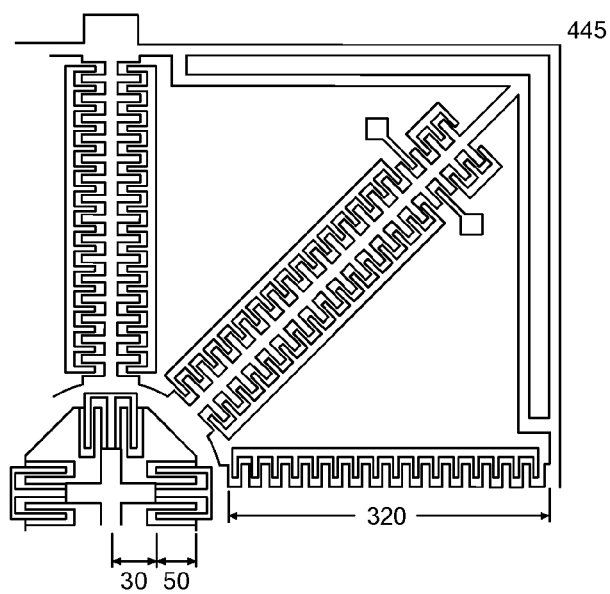

FIG. 7 is a schematic top-view diagram of a vibratory gyroscope in accordance with one alternative embodiment of the present invention. This vibratory gyroscope operates generally as the one described above with reference to FIGS. 1 and 2, but is considered to be a simpler design by virtue of having fewer structures. Also, the predominant gyroscope structures are oriented along the up and down axes or at 45 degree angles thereto, which facilitates micromachining because micromachining equipment (e.g., etching equipment) often produce etches based upon a rectilinear grid and so structures that are aligned with the grid or at 45 degree angles thereto generally may be produced more consistently and with straighter edges.

It should be noted that the present invention is not limited to the gyroscope designs shown in FIGS. 1-2 and 7. In various alternative embodiments, gyroscopes having one, two, or more (e.g., four) shuttles of the types shown and described in Geen, U.S. Pat. No. 5,635,640 may be used. Furthermore, the present invention is not limited to shuttles that oscillate rotationally but can be applied more generally to other types of inertial sensors, e.g., vibratory and tuning-fork type gyroscopes, that operate under similar principles, in which the drive signal can be modulated to induce corresponding signals in the Coriolis channel. In various embodiments, the accelerometer mode may be in-plane or out-of-plane compared with the resonator mode.

Figure 8:
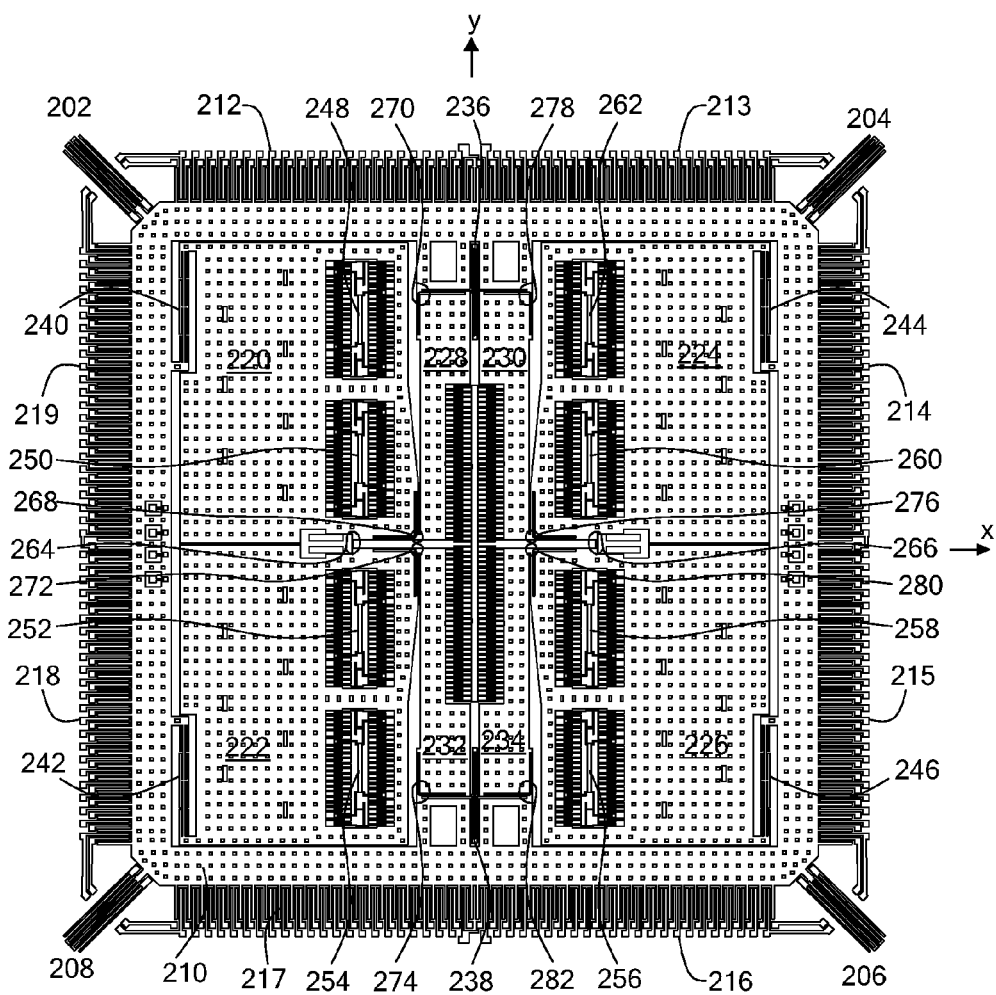
FIG. 8 is a schematic top-view diagram of an exemplary vibratory Z axis gyroscope in accordance with another alternative embodiment of the present invention.

FIG. 8 is a schematic top-view diagram of a vibratory Z axis gyroscope in accordance with another alternative embodiment of the present invention. This gyroscope operates generally as disclosed in Geen, U.S. Pat. No. 6,877,374, which is hereby incorporated herein by reference in its entirety. Among other things, this gyroscope structure includes a substantially square frame 210 that is suspended at its four corners by accelerometer suspension flexures 202, 204, 206, and 208. On the outside four edges of the frame 210 are fingers 212, 213, 214, 215, 216, 217, 218, and 219. Various resonating structures are suspended within the frame 210. These resonating structures include four movable shuttles 220, 222, 224, and 226, four levers 228, 230, 232, and 234, and two forks 236 and 238. It should be noted that the shuttles 222, 224, and 226 are substantially the same shape, size, and mass as the shuttle 220, and are oriented as mirror images of the shuttle 220 along the x and/or y axes. It should be noted that the levers 230, 232, and 234 are substantially the same shape, size, and mass as the lever 228, and are oriented as mirror images of the lever 228 along the x and/or y axes. The four movable shuttles 220, 222, 224, and 226 are suspended from the frame 210 by flexures 240, 242, 244, and 246, respectively. Movement of the four movable shuttles 220, 222, 224, and 226 is controlled electrostatically using electrostatic drivers 248, 250, 252, 254, 256, 258, 260, and 262. There are also electrostatic structures associated with the levers 228, 230, 232, and 234 that can be used for driving motion of the levers or sensing motion of the levers. These and other features of the micromachined gyroscope structure are described in more detail below.

The four accelerometer suspension flexures 202, 204, 206, and 208 are anchored to the substrate and are configured so as to substantially restrict movement of the frame 210 along the x axis and along the y axis (i.e., translational movement) while allowing the frame 210 to rotate more freely in either direction (i.e., rotational movement). Such rotational movement of the frame 110 is caused mainly from the Coriolis effect due to movement of the frame of reference of the resonating structures.

The fingers 212, 213, 214, 215, 216, 217, 218, and 219 extend from the four sides of the frame 210. Positioned between the fingers 212, 213, 214, 215, 216, 217, 218, and 219 are two sets of Coriolis sensors that are mechanically coupled to the substrate and do not move relative to the substrate. Movement of the frame 210 results in movement of the fingers 212, 213, 214, 215, 216, 217, 218, and 219 relative to the Coriolis sensors, which produces a change in capacitance that can be measured by electronic circuitry (not shown).

The resonating structures, including the shuttles 220, 222, 224, and 226, the flexures 240, 242, 244, and 246, the levers 228, 230, 232, and 234, and the forks 236 and 238, are mechanically coupled. The shuttles 220 and 222 are mechanically coupled via a pivot flexure 264, and the shuttles 224 and 226 are mechanically coupled via a pivot flexure 266. The shuttles 220 and 224 are mechanically coupled via the levers 228 and 230 and the fork 236, and the shuttles 222 and 226 are mechanically coupled via the levers 232 and 234 and the fork 238. The pivot flexures 264 and 266, the levers 228, 230, 232, and 234, and the forks 236 and 238 allow the shuttles 220, 222, 224, and 226 to move together.

The shuttle 220 is suspended from the frame 210 by the flexure 240, from the shuttle 222 by the pivot flexure 264, and from the lever 228 by the pivot flexure 268. The shuttle 222 is suspended from the frame 210 by the flexure 242, from the shuttle 220 by the pivot flexure 264, and from the lever 232 by the pivot flexure 272. The shuttle 224 is suspended from the frame 210 by the flexure 244, from the shuttle 226 by the pivot flexure 266, and from the lever 230 by the pivot flexure 276. The shuttle 226 is suspended from the frame 210 by the flexure 246, from the shuttle 224 by the pivot flexure 266, and from the lever 234 by the pivot flexure 280.

The lever 228 is suspended from the frame 210 by the pivot flexure 270, from the shuttle 220 by the pivot flexure 268, and from the lever 230 by the fork 236. The lever 230 is suspended from the frame 210 by the pivot flexure 278, from the shuttle 224 by the pivot flexure 276, and from the lever 228 by the fork 236. The lever 232 is suspended from the frame 210 by the pivot flexure 274, from the shuttle 222 by the pivot flexure 272, and from the lever 234 by the fork 238. The lever 234 is suspended from the frame 210 by the pivot flexure 282, from the shuttle 226 by the pivot flexure 280, and from the lever 232 by the fork 238.

The flexures 240, 242, 244, and 246 substantially restrict movement of the shuttles 220, 222, 224, and 226 respectively along the y axis, but allow movement of the shuttles 220, 222, 224, and 226 respectively along the x axis. The flexures 240, 242, 244, and 246 also allow the shuttles 220, 222, 224, and 226 respectively to pivot slightly as they move.

The pivot flexure 264 essentially locks the shuttles 220 and 222 together so that they move together. Likewise, the pivot flexure 266 essentially locks the shuttles 224 and 226 together so that they move together (although oppositely to the shuttles 220 and 222).

The levers 228 and 230, the fork 236, and the pivot flexures 268, 270, 276, and 278 essentially lock the shuttles 220 and 224 together so that they move in substantially equal but opposite directions. Likewise, the levers 232 and 234, the fork 238, and the pivot flexures 272, 274, 280, and 282 essentially lock the shuttles 222 and 226 together so that they move in substantially equal but opposite directions.

Figure 9:
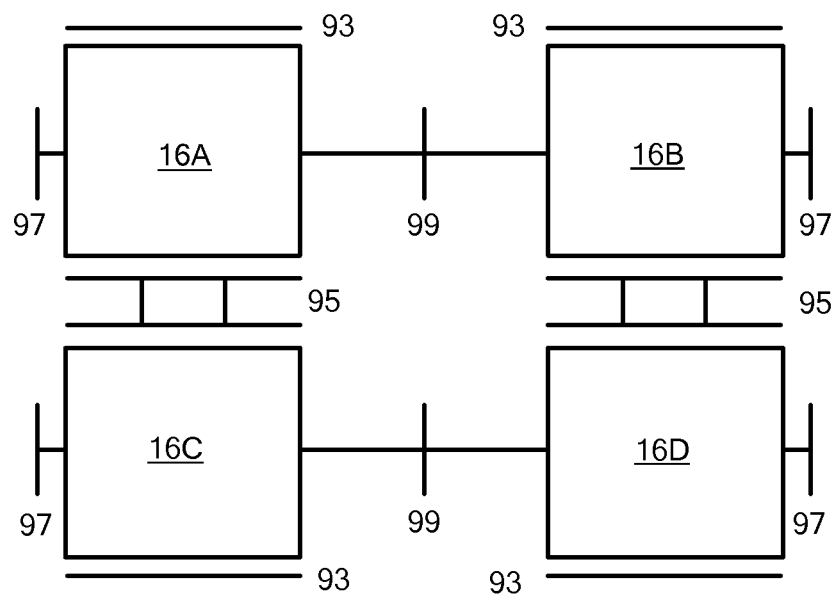
FIG. 9 is a schematic top-view diagram of a cross-quad Z axis gyroscope in accordance with another alternative embodiment of the present invention.

FIG. 9 is a schematic top-view diagram of a cross-quad Z axis gyroscope in accordance with another alternative embodiment of the present invention. This gyroscope operates generally as disclosed in Geen, U.S. Pat. No. 7,421,897, which is hereby incorporated herein by reference in its entirety. Specifically, four gyroscopes 16A-D are arranged in a vertically and horizontally coupled cross-quad configuration such that the top pair of gyroscope frames and the bottom pair of gyroscope frames are interconnected by couplings 99 that allow anti-phase movements of the frames along separate parallel Y axes, while the left side pair of gyroscope frames and the right side pair of gyroscope frames are interconnected by couplings 95 that allow co-linear anti-phase movements of the frames. Each gyroscope is preferably supported on the side opposite the vertical coupling 95 by a suspension 93. The gyroscopes 16A-D may be similar to the gyroscopes disclosed in U.S. Pat. Nos. 6,505,511 and 6,122,961, which are hereby incorporated herein by reference in their entireties.

Figure 10:
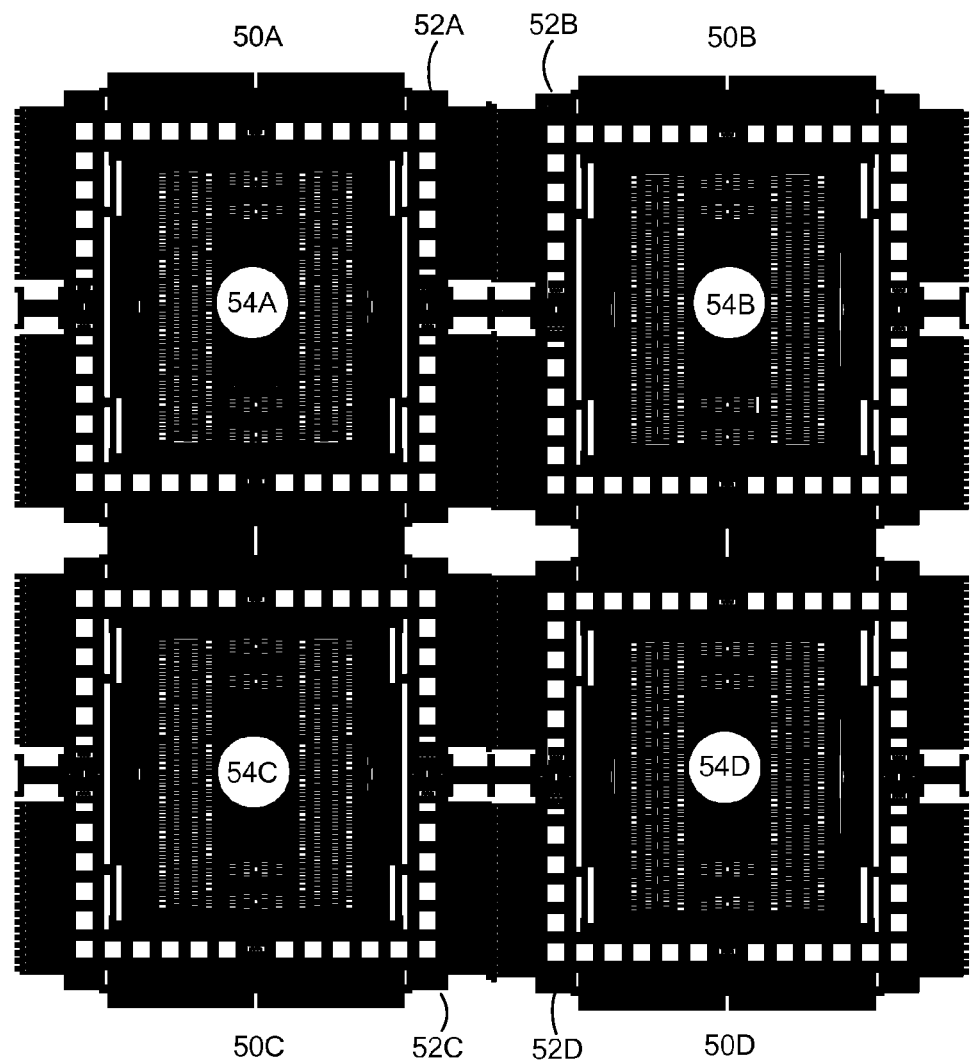
FIG. 10 shows a specific cross-quad gyroscope configuration that can be adapted for mode matching, in accordance with the embodiment shown in FIG. 9.

FIG. 10 shows a specific cross-quad gyroscope configuration that can be adapted for mode matching, in accordance with another alternative embodiment of the present invention. Here, each gyroscope 50A, 50B, 50C, 50D includes a frame (52A, 52B, 52C, 52D) and a resonator (54A, 54B, 54C, 54D) movably suspended within the inner periphery of the frame. The frames 52A and 52B of gyroscopes 50A and 50B are coupled to one another, as are the frames 52C and 52C of gyroscopes 50C and 50D. Furthermore, the frames 52A and 52C of gyroscopes 50A and 50C are coupled to one another, as are the frames 52B and 52D of gyroscopes 50B and 50D.

The resonators of each pair of gyroscopes 50A/50B and 50C/50D operate in anti-phase to one another. Furthermore, in an exemplary embodiment of the invention, the resonators of gyroscopes 50A and 50B operate in anti-phase to the corresponding resonators of gyroscopes 50C and 50D. Therefore, the resonators of gyroscopes that are diagonally opposite operate in phase with one another, while the resonators of any pair of adjacent gyroscopes operate in anti-phase with one another.

Also, the frames of each pair of gyroscopes 50A/50B and 50C/50D are coupled to allow movement in opposite directions but substantially restrict movement in the same direction. Furthermore, in accordance with an exemplary embodiment of the invention, the frames of gyroscopes 50A and 50C are coupled to allow movement in opposite directions but substantially restrict movement in the same direction, as are frames of gyroscopes 50B and 50D. The frames of gyroscopes 50A/50C move in anti-phase to the frames of gyroscopes 50B/50D. Therefore, the frames of gyroscopes that are diagonally opposite operate in phase with one another, while the frames of any pair of adjacent gyroscopes operate in anti-phase with one another.

The resonators are caused to resonate back and forth in the X-axis. Rotation of the inertial sensor about the Z-axis causes displacement of the frames in the Y-axis. For example, under some conditions, frames 52A and 52C of gyroscopes 50A and 50C move toward one another while frames 52B and 52D of gyroscopes 50B and 50D move away from one another. Under some other conditions, frames 52A and 52C of gyroscopes 50A and 50C move away from one another while frames 52B and 52D of gyroscopes 50B and 50D move toward one another.

As in the exemplary embodiments described above with reference to FIGS. 1-2 and 7, the gyroscopes described above with reference to FIGS. 8-10 are subject to in-phase offset errors, electronic pass-through, and other errors relating to the drive signal. For example, in the gyroscope described above with reference to FIG. 8, in-phase offset errors may impart rotational forces on the gyroscope frame that produce error signals in the Coriolis channel. Similarly, in the gyroscope described above with reference to FIG. 10, in-phase offset errors may impart y-axis forces on the gyroscope frames that produce error signals in the Coriolis channel. Errors relating to the drive signal can be detected by modulating the drive signal and sensing corresponding signals induced in the Coriolis channel and can be mitigated electronically, electro-mechanically, or otherwise, e.g., substantially as described above with reference to FIGS. 3-6.

Thus, embodiments of the present invention may include one-axis (e.g, x-axis, y-axis, or z-axis) inertial sensors, two-axis (e.g., x-y axis or x-z axis) inertial sensors, and three-axis inertial sensors.

Similar to detecting error sources relating to the drive signal as described above, certain embodiments of the present invention additionally or alternatively detect error sources relating to the aerodynamics of the resonator by modulating the distance between the resonator and the underlying substrate and detecting accelerometer signals induced by such modulation. Thus, for example, a drive signal may be provided so as to cause resonance of the resonator, a modulated test signal may be provided (e.g., to the quadrature-compensating electrodes, the in-phase compensating electrodes, and/or to separate test electrodes) to modulate the distance between the resonator and the underlying substrate, and accelerometer signals induced by the modulated test signal may be sensed in order to detect and/or compensate for the aerodynamics of the resonator. As in embodiments described above, the test signal may be modulated using one of amplitude modulation, frequency modulation, on/off keying, and a spread spectrum modulation. The accelerometer signals may be demodulated based on the modulation signal used to modulate the test signal. A compensating signal may be provided to substantially cancel errors caused by the aerodynamic effects. Compensating signals may be provided via the in-phase compensating electrodes or other suitable electrodes. A servo of the type shown in FIG. 5 for driving the in-phase-compensating electrodes based on the Coriolis channel output in concert with the modulated test signal used to modulate the distance between the resonator and the substrate may be used to detect and/or mitigate aerodynamic effects.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A method of detecting at least one error source relating to the magnitude of a drive signal applied to the resonator in an inertial sensor having a resonator and an accelerometer for measuring a Coriolis acceleration signal in a Coriolis acceleration signal band of a Coriolis channel, wherein the at least one error source induces corresponding error signals in the Coriolis channel that are in-phase with the drive signal and include error signals that affect the Coriolis acceleration signal, the method comprising:

providing a modulated drive signal to the resonator, the modulated drive signal modulating the magnitude of the drive force applied to the resonator so as to modulate the magnitude of the at least one error source so as to induce corresponding modulated error signals in the Coriolis channel, wherein the error signals are modulated at a frequency outside of the Coriolis acceleration signal band;

sensing the modulated error signals in the Coriolis channel; and providing at least one compensating signal responsive to the sensed modulated error signals to substantially cancel errors introduced by the at least one error source that affect the Coriolis acceleration signal.

2. A method according to claim 1, wherein providing the modulated drive signal to the resonator comprises:
modulating a drive signal using one of amplitude modulation, frequency modulation, on/off keying, or a spread spectrum modulation.

3. A method according to claim 1, wherein sensing modulated error signals induced by the modulated drive signal includes demodulating accelerometer signals based on a modulation signal used to modulate the drive signal.

4. A method according to claim 1, wherein the at least one error source includes in-phase offset error that is substantially in-phase with the modulated drive signal, and wherein providing at least one compensating signal responsive to the sensed accelerometer signals comprises providing at least one compensating signal to substantially cancel the in-phase offset error.

5. A method according to claim 4,
wherein providing at least one compensating signal to substantially cancel the in-phase offset error comprises providing a compensating signal to a set of in-phase-compensating electrodes to substantially cancel the in-phase offset error.

6. A method according to claim 4, wherein the at least one error source includes drive force misalignment.

7. A method according to claim 1, wherein the at least one error source includes electronic pass-through of the drive signal to the accelerometer, and wherein providing at least one compensating signal responsive to the sensed modulated error signals comprises providing at least one compensating signal to substantially cancel the pass-through.

8. A method according to claim 7,
wherein providing at least one compensating signal to substantially cancel the pass-through comprises providing a compensating signal to the accelerometer to substantially cancel the pass-through.

9. A method according to claim 1, wherein the resonator includes a plurality of shuttles coupled to resonate at a single resonance frequency.

10. A method according to claim 1, wherein the accelerometer includes at least one of:
a sense electrode in a plane of the resonator; or
a sense electrode out of the plane of the resonator.

11. An inertial sensor comprising:
a resonator;
an accelerometer for measuring a Coriolis acceleration signal in a Coriolis acceleration signal band of a Coriolis channel, wherein the at least one error source induces corresponding error signals in the Coriolis channel that are in-phase with the drive signal and include error signals that affect the Coriolis acceleration signal;
a resonator driver configured to provide a modulated drive signal to the resonator, the modulated drive signal modulating the magnitude of the drive force applied to the resonator so as to modulate the magnitude of the at least one error source so as to induce corresponding modulated error signals in the Coriolis channel, wherein the error signals are modulated at a frequency outside of the Coriolis acceleration signal band;
an offset detector configured to sense the modulated error signals in the Coriolis channel; and
a servo configured to provide at least one compensating signal responsive to the sensed modulated error signals to substantially cancel errors introduced by the at least one error source that affect the Coriolis acceleration signal.

12. An inertial sensor according to claim 11, wherein the resonator driver is configured to modulate the drive signal using one of amplitude modulation, frequency modulation, on/off keying, or a spread spectrum modulation.

13. An inertial sensor according to claim 11, wherein the offset detector is configured to demodulate accelerometer signals based on a modulation signal used to modulate the drive signal to sense modulated error signals induced by the modulated drive signal.

14. An inertial sensor according to claim 11, wherein the at least one error source includes in-phase offset error that is substantially in-phase with the modulated drive signal, and wherein the servo is configured to provide at least one compensating signal responsive to the sensed accelerometer signals to substantially cancel the in-phase offset error.

15. An inertial sensor according to claim 14, wherein the servo is configured to provide a compensating signal to a set of in-phase-compensating electrodes to substantially cancel the in-phase offset error.

16. An inertial sensor according to claim 14, wherein the at least one error source includes drive force misalignment.

17. An inertial sensor according to claim 11, wherein the at least one error source includes electronic pass-through of the drive signal to the accelerometer, and wherein the servo is configured to provide at least one compensating signal responsive to the sensed modulated error signals to substantially cancel the pass-through.

18. An inertial sensor according to claim 17, wherein the servo is configured to provide a compensating signal to the accelerometer to substantially cancel the pass-through.

19. An inertial sensor according to claim 11, wherein the resonator includes a plurality of shuttles coupled to resonate at a single resonance frequency.

20. An inertial sensor according to claim 11, wherein the accelerometer includes at least one of:
a sense electrode in a plane of the resonator; or
a sense electrode out of the plane of the resonator.

21. A controller for detecting at least one error source relating to the magnitude of a drive signal applied to a resonator of an inertial sensor including the resonator and an accelerometer for measuring a Coriolis acceleration signal in a Coriolis acceleration signal band of a Coriolis channel, wherein the at least one error source induces corresponding error signals in the Coriolis channel that are in-phase with the drive signal and include error signals that affect the Coriolis acceleration signal, the controller comprising:
a resonator driver configured to provide a modulated drive signal to the resonator, the modulated drive signal modulating the magnitude of the drive force applied to the resonator so as to modulate the magnitude of the at least one error source so as to induce corresponding modulated error signals in the Coriolis channel, wherein the error signals are modulated at a frequency outside of the Coriolis acceleration signal band;
an offset detector configured to sense the modulated error signals in the Coriolis channel; and
a servo configured to provide at least one compensating signal responsive to the sensed accelerometer signals to the inertial sensor to substantially cancel errors introduced by the at least one error source that affect the Coriolis acceleration signal.

22. A controller according to claim 21, wherein the resonator driver is configured to modulate the drive signal using one of amplitude modulation, frequency modulation, on/off keying, or a spread spectrum modulation.

23. A controller according to claim 21, wherein the offset detector is configured to demodulate accelerometer signals based on a modulation signal used to modulate the drive signal to sense modulated error signals induced by the modulated drive signal.

24. A controller according to claim 21, wherein the at least one error source includes in-phase offset error that is substantially in-phase with the modulated drive signal, and wherein the servo is configured to provide at least one compensating signal responsive to the sensed modulated error signals to substantially cancel the in-phase offset error.

25. A controller according to claim 24, wherein the servo is configured to provide a compensating signal to a set of in-phase-compensating electrodes to substantially cancel the in-phase offset error.

26. A controller according to claim 24, wherein the at least one error source includes drive force misalignment.

27. A controller according to claim 21, wherein the at least one error source includes electronic pass-through of the drive signal to the accelerometer, and wherein the servo is configured to provide at least one compensating signal responsive to the sensed accelerometer signals to substantially cancel the pass-through.

28. A controller according to claim 27, wherein the servo is configured to provide a compensating signal to the accelerometer to substantially cancel the pass-through.

* * * * *